Figure 1:
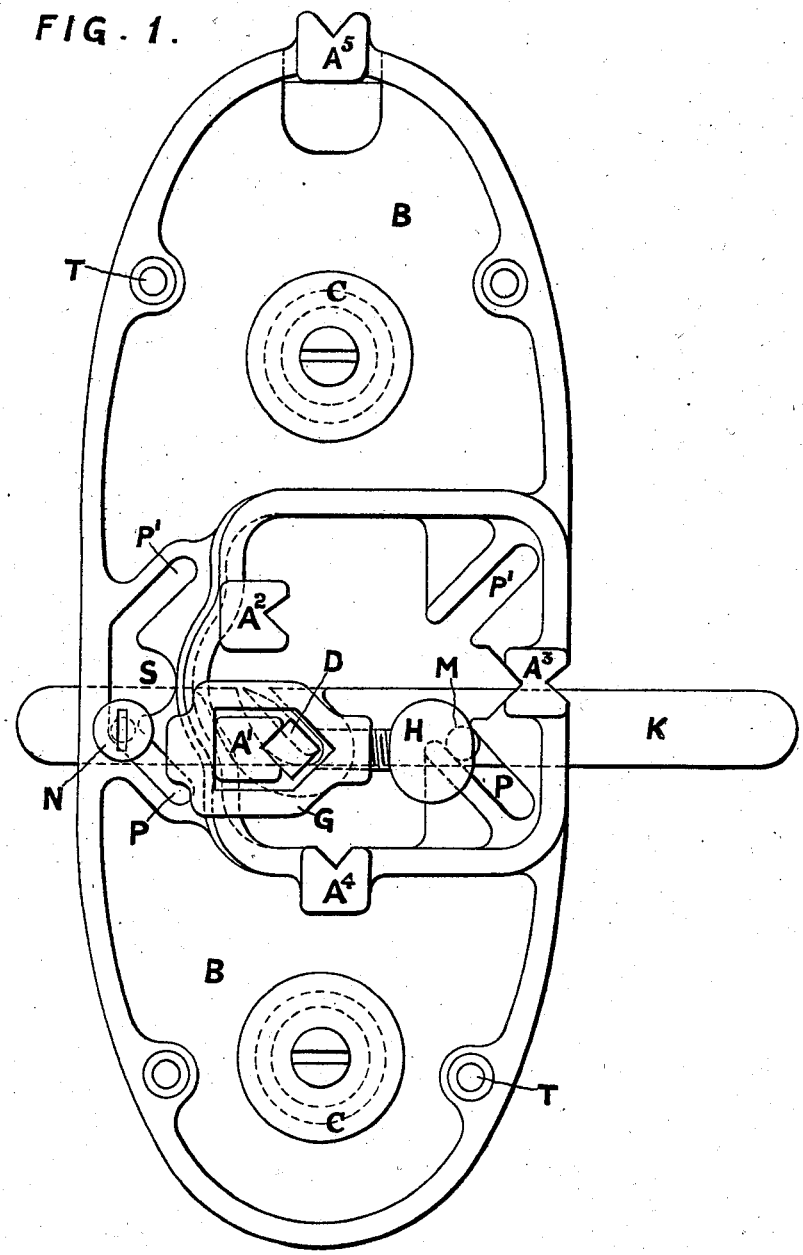

No. 707,085. Patented Aug. 19, 1902.
F. CLAYTON.
RECESSING OR GROOVING PLANE.
(Application filed Apr. 1, 1902.)

(No Model.) 3 Sheets—Sheet 1.

WITNESSES:
Allan Bennett.
Harry Davies.

INVENTOR:
Fred Clayton
per John E. Walsh
Attorney.

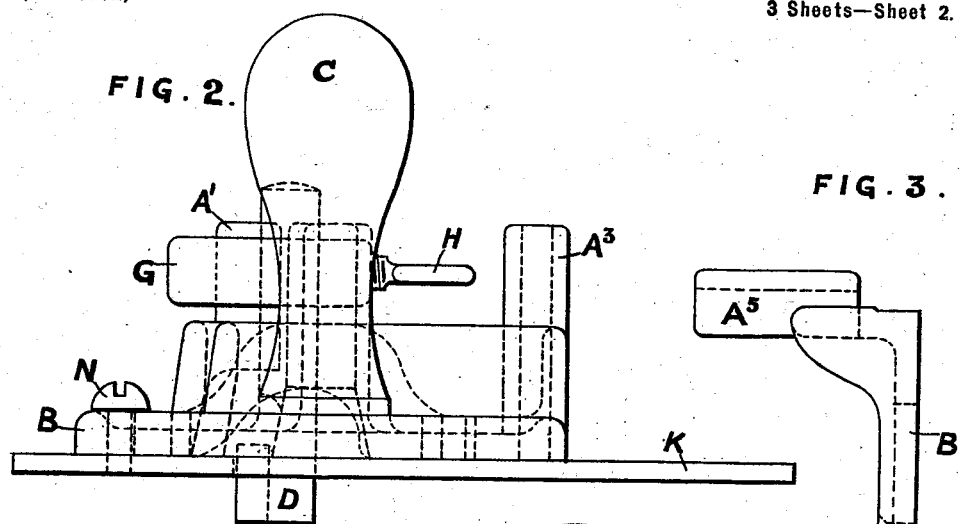
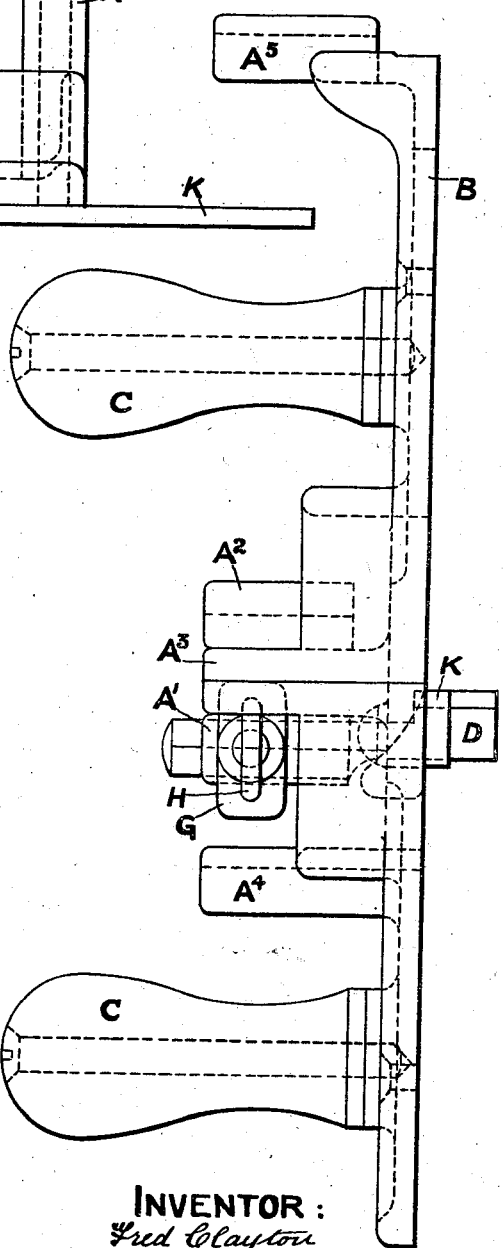
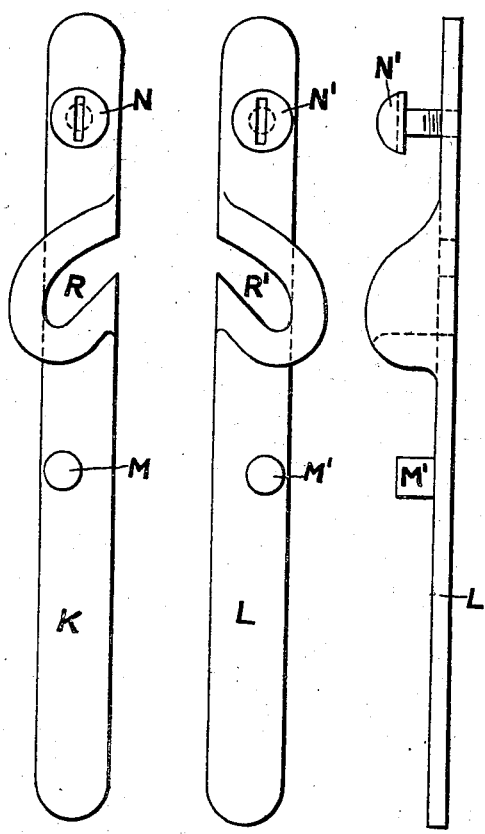

No. 707,085. Patented Aug. 19, 1902.
F. CLAYTON.
RECESSING OR GROOVING PLANE.
(Application filed Apr. 1, 1902.)
(No Model.) 3 Sheets—Sheet 3.
FIG. 8. FIG. 7.
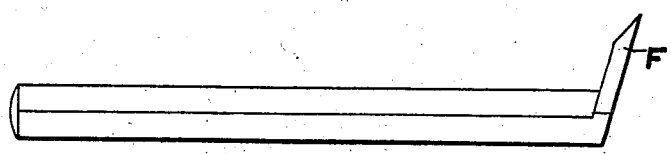 
FIG. 9. FIG. 10.
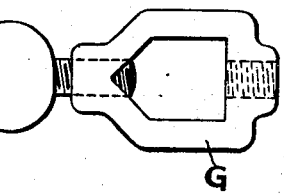 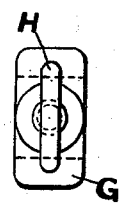
FIG. 11. FIG. 13.
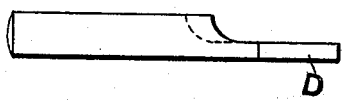 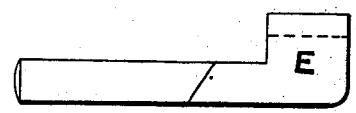
FIG. 12. FIG. 14.
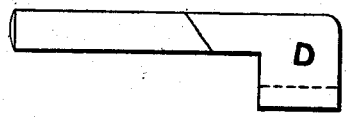 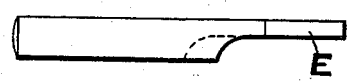
WITNESSES:
Allan Bennett
Harry Davies.
INVENTOR:
Fred Clayton
per John E. Walsh
Attorney.

UNITED STATES PATENT OFFICE.

FRED CLAYTON, OF PUDSEY, ENGLAND.

RECESSING OR GROOVING PLANE.

SPECIFICATION forming part of Letters Patent No. 707,085, dated August 19, 1902.

Application filed April 1, 1902. Serial No. 100,915. (No model.)

*To all whom it may concern:*

Be it known that I, FRED CLAYTON, a subject of the King of Great Britain and Ireland, residing at Pudsey, near Leeds, in the county of York, England, have invented a new and useful Recessing or Grooving Plane, of which the following is a specification.

My invention relates to an improved recessing or grooving plane in which various tools are interchangeable in various positions in the plane according to the nature and situation of the work required to be done, such plane being applicable for planing the bottom and sides of grooves in woodwork—such, for instance, as grooves in hoist-slides, grooves in collapsible boxes, shelf-grooves in cupboard sides, step-grooves in staircase sides, grooves in the sides of core-boxes for the ends to fit into, and grooves in patterns into which lifting-irons, fillets, or ribs are recessed. It is applicable also for planing out the bottom of panels and all other depressions or recesses below the general surface of the woodwork.

My invention is illustrated in the accompanying drawings, in which—

Figure 1 is a plan, Fig. 2 an end view, and Fig. 3 a side view, of my improved plane, showing a right-hand side tool in position for use. Fig. 4 is a plan of regulating or adjusting slide for right-hand side tool. Fig. 5 is a plan and Fig. 6 a side view of regulating or adjusting slide for left-hand side tool. Fig. 7 is a plan and Fig. 8 a side view of bottom tool. Fig. 9 is a plan and Fig. 10 an end view of loose collar and screw by which the various tools are secured in position. Fig. 11 is an end view, and Fig. 12 a side view, of right-hand side tool. Fig. 13 is a side view, and Fig. 14 an end view, of left-hand side tool.

Similar letters refer to similar parts throughout the several views.

My improved plane consists of a frame or body B, preferably having two handles C C and fitted with five vertical tool-posts A' A² A³ A⁴ A⁵ in suitable positions on the said frame or body B. A right-hand side tool D, Figs. 1, 11, and 12, a left-hand side tool E, Figs. 13 and 14, and a bottom tool F, Figs. 7 and 8, are provided, the side tools D and E being fitted in the posts A' and A², respectively, and the bottom tool F being interchangeable in the tool-posts A³ A⁴ A⁵. The tools are held in position in the desired post so as to be adjustable vertically therein by means of a loose collar G, having thumb-screw H.

A right-hand slide K for use with the side tool D may be fitted beneath the frame or body B of the plane, this slide being secured and adjusted by means of pin M and screw N, working within a pair of parallel oblique slots P P in the frame or body B. The cutting-tool D when in position passes through a side opening R in the said slide K, the amount of cut being regulated by tapping the slide at the ends. A similar left-hand slide L is provided for use with the side tool E, this slide having side opening R' and being similarly secured by pin M' and screw N', working within a second pair of parallel oblique slots P' P'. These slides K L are removed when not required by slackening their respective screws N N' and withdrawing the pins M M' and screws N N' from their respective slots, a suitable opening S in the frame being provided to allow for the insertion and withdrawal of the screw-heads. By this means the plane can be adapted to a large variety of work, the required tool being fixed in the post best suited to the purpose. Thus for planing the sides of grooves or recesses the tools D and E would be employed, fixed in the post A', as shown in Figs. 1, 2, and 3, and in the post A², respectively. For general purposes of planing out the bottom of grooves the tool F would be fixed on the inside of the post A³. For work in which the tool is required to go in advance of the plane the tool would be fixed on the outside of the post A³. Where the work operated upon is short and the recess deep the tool would be fixed in the post A⁴, so as to obtain bearing-surface both in front of and behind the tool. For work in which the tool is required to follow the plane— as, for instance, in half-lapping—the tool would be fixed in the post A⁵.

T represents holes for screws for attaching a curved piece of wood to the bottom of the plane-body when desired.

What I claim is—

1. The combination, with a plane-body provided with a series of separate tool-posts arranged in different planes, of a clamp for securing tools to the said posts, substantially as set forth.

2. The combination, with a plane-body provided with separate tool-posts arranged in different planes and having also oblique slots, of an adjustable slide provided with fastening devices which engage with the said slots, and a clamp for securing tools to the said posts, substantially as set forth.

3. The combination, with a plane-body provided with separate tool-posts arranged in different planes and having also two pairs of oblique slots for right and left hand side tools provided with fastening devices which engage with the said slots, and a clamp for securing the tools to the said posts, substantially as set forth.

In testimony whereof I have signed my name to this specification in the presence of two subscribing witnesses.

FRED CLAYTON.

Witnesses:
ALLAN BENNETT,
LEWIS DEXTER.